United States Patent
Bogoni et al.

(10) Patent No.: US 8,149,488 B2
(45) Date of Patent: Apr. 3, 2012

(54) METHOD OF OPERATING A RECONFIGURABLE AND INTEGRABLE OPTICAL LOGIC GATE BASED ON A SINGLE SOA

(75) Inventors: Antonella Bogoni, Montova (IT); Luca Poti, Pisa (IT); Gianluca Berrettini, Lappato (IT); Antonio Malacarne, Leghorn (IT)

(73) Assignee: Ericsson AB, Stockholm (SE)

(*) Notice: Subject to any disclaimer, the term of this patent is extended or adjusted under 35 U.S.C. 154(b) by 418 days.

(21) Appl. No.: 12/088,585

(22) PCT Filed: Sep. 22, 2006

(86) PCT No.: PCT/EP2006/009252
§ 371 (c)(1),
(2), (4) Date: Apr. 11, 2008

(87) PCT Pub. No.: WO2007/039152
PCT Pub. Date: Apr. 12, 2007

(65) Prior Publication Data
US 2008/0247018 A1    Oct. 9, 2008

(30) Foreign Application Priority Data
Sep. 28, 2005    (IT) .................... MI20051801

(51) Int. Cl.
*G02F 3/00*    (2006.01)
(52) U.S. Cl. ........................................ 359/108
(58) Field of Classification Search .............. 359/108, 359/344; 385/27, 122
See application file for complete search history.

(56) References Cited

U.S. PATENT DOCUMENTS

| | | | | |
|---|---|---|---|---|
| 5,987,040 | A * | 11/1999 | Nesset et al. | 372/8 |
| 6,151,428 | A * | 11/2000 | Vahala et al. | 385/11 |
| 7,248,400 | B2 * | 7/2007 | Byun et al. | 359/344 |
| 2002/0054404 | A1 * | 5/2002 | Hedekvist et al. | 359/108 |
| 2003/0035207 | A1 * | 2/2003 | Gray et al. | 359/344 |
| 2004/0125426 | A1 * | 7/2004 | McAulay | 359/108 |

OTHER PUBLICATIONS

Kim, Jae Hun et al. "All-Optical Logic Gates Using Semiconductor Optical-Amplifier-Based Devices and Their Applications." Journal of the Korean Physical Society, vol. 4, No. 5, Nov. 2004, pp. 1158-1161.

Kumar, S. et al. "All Optical XNOR Gate Using Simultaneous Four-Wave Mixing and Cross-Gain Modulation in an SOA." The 17th Annual Meeting of the Lasers and Electro-Optics Society, 2004. vol. 2, Nov. 8-9, 2004, pp. 913-914.

(Continued)

*Primary Examiner* — Frank Font
(74) *Attorney, Agent, or Firm* — Coats & Bennett, PLLC

(57) ABSTRACT

An optical logic gate (10) comprising inputs (12) for optical signals on which to perform a chosen logical operation. An SOA (11) element receives such input signals to be piloted thereby in saturation and its output is connected to at least one optical filter (14, 15, 16) that filters components of signals output from the SOA and which represent a desired logical result of the signals input at the gate so that at the output (13) of the filter there is an optical signal as the result of the desired logical operation. A probe signal (17) can also be provided. An appropriate combination of power of the input, power and probe signal wavelength and central wavelength of the filter allows obtaining a plurality of logic functions such as NOR, NOT, inverted XOR, AND, OR.

6 Claims, 2 Drawing Sheets

OTHER PUBLICATIONS

Figure 1:
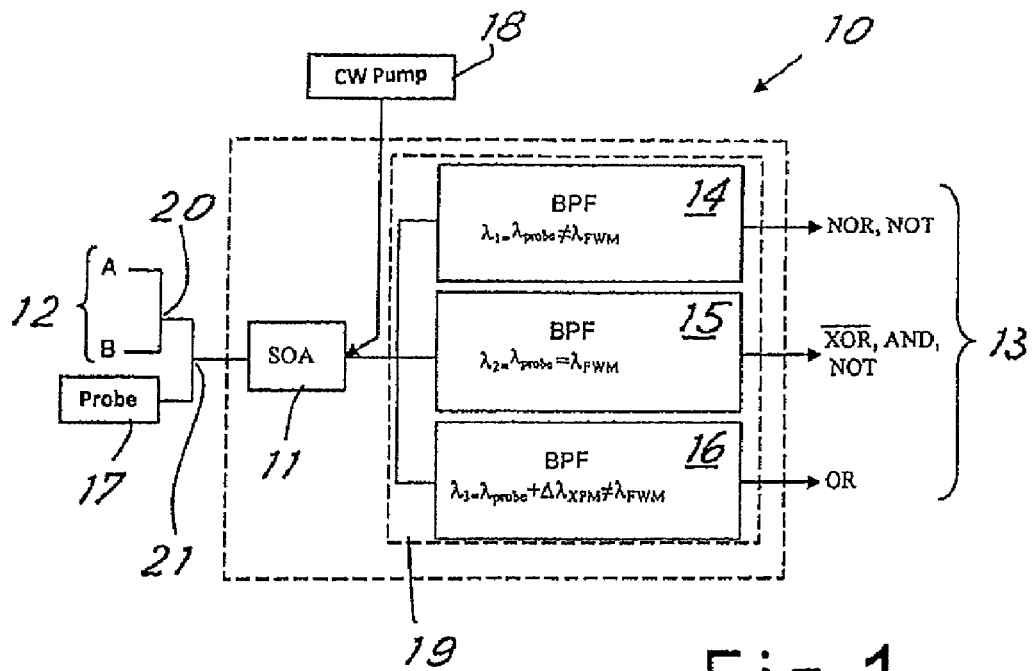

Li, Z. et al. "All-Optical Logic Gates Based on an SOA and an Optical Filter." 31st European Conference on Optical Communication, vol. 2, Sep. 27, 2005, pp. 229-230.

Soto, H. et al. "Experimental Demonstration of All-Optical Logic Gates Using Cross-Polarization Modulation in a Semiconductor Optical Amplifier." Proceedings of the SPIE—The International Society for Optical Engineering, vol. 4602, 2001, pp. 1-8, 2002.

* cited by examiner

METHOD OF OPERATING A RECONFIGURABLE AND INTEGRABLE OPTICAL LOGIC GATE BASED ON A SINGLE SOA

This invention relates to an integrable diagram based on a single SOA to realize ultrafast and reconfigurable optical logic gates able to produce for example NOT, AND, OR, NOR and inverted XOR functions.

The development of all-optical technologies is fundamental for realizing future telecommunications networks where all the node functionalities will have to be carried out in the optical domain.

All-optical functions for add-drop multiplexing, packet synchronization, clock recovery, address recognition, signal regeneration et cetera are essential to avoid optoelectric conversions, which can represent the bottleneck to obtaining broadband and flexible networks.

All-optical logic gates are a key element in the realization of such functionalities. In the literature, there have been proposed some all-optical logic gate diagrams using non-linear effects in the optical fibers or in semiconductor devices. In general, that already proposed does not offer satisfactory performance or integration possibilities.

The general purpose of this invention is to remedy the above mentioned shortcomings by making available optical logic gates that would be reconfigurable and integrable based on a single SOA.

In view of this purpose it was sought to provide in accordance with this invention an optical logic gate comprising inputs for optical signals on which to perform a chosen logical operation, an SOA element that receives such input signals to be piloted thereby in saturation and whose output is connected to at least one optical filter that filters signal components output from the SOA and that represent a desired logical result of the signals input at the gate so that at the output of the filter there is an optical signal as the result of the desired logical operation.

Figure 2:
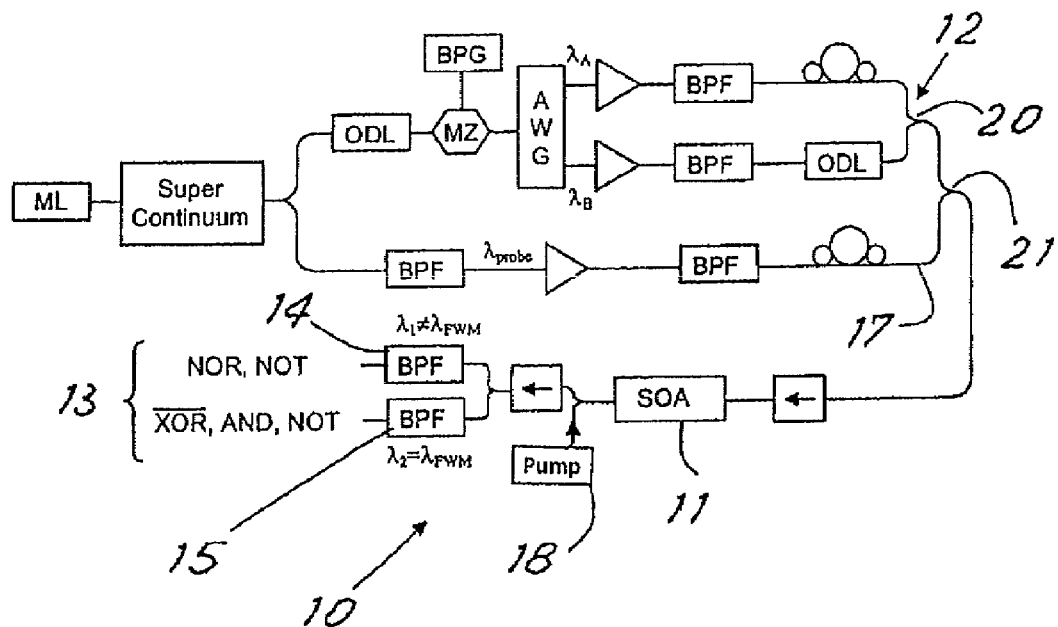
Figure 3:
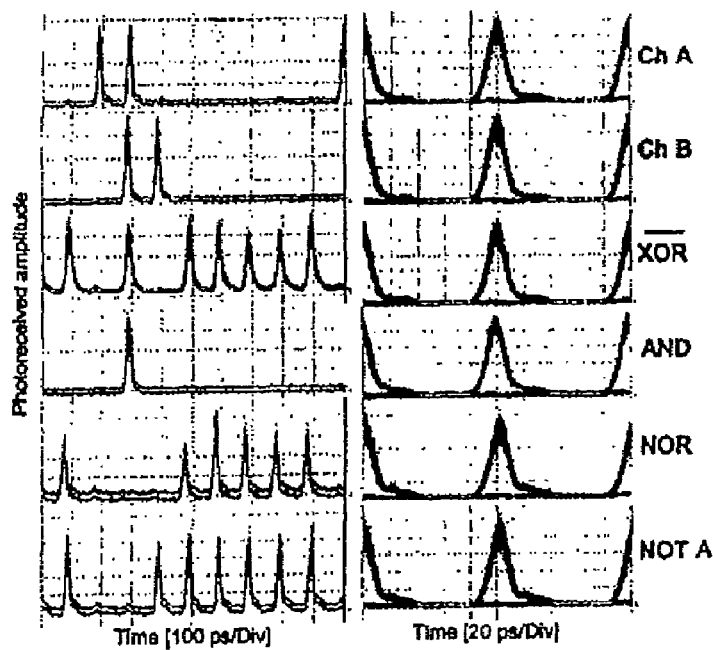
Figure 4:
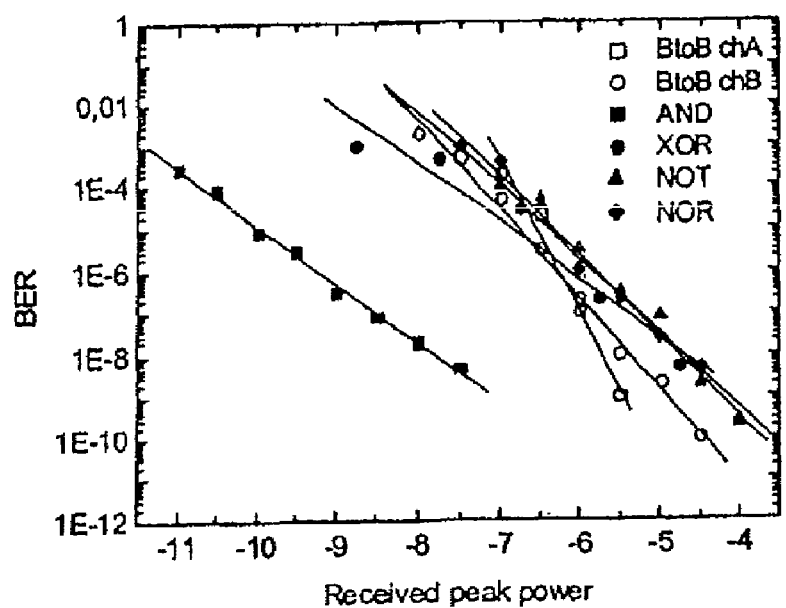

To clarify the explanation of the innovative principles of this invention and its advantages compared with the prior art there is described below with the aid of the annexed drawings a possible embodiment thereof by way of non-limiting example applying said principles. In the drawings:

FIG. 1 shows a diagram of a reconfigurable logic gate realized in accordance with the principles of this invention, FIG. 2 shows an experimental preparation for the test of a device realized in accordance with this invention, FIG. 3 shows (left) a graph of sequences of input signals and the corresponding logical output (right) and the corresponding rough diagrams for different types of logic gate obtained with a device in accordance with this invention, and FIG. 4 shows the BER of the back-to-back input signals and of the logical output in the various configurations.

With reference to the figures, FIG. 1 shows a diagram of a reconfigurable logic gate designated as a whole by reference number 10 and based on a known Semiconductor Optical Amplifier (SOA) 11.

The gate 10 comprises inputs 12 and one or more logical outputs 13 connected to the output of the SOA by means of known all optical Band-Pass Filters (BPF) 14, 15, 16.

The signals on which to perform the logical operation are input to the SOA through an input element made up of at least one known optical coupler 20.

As set forth below, with the diagram proposed, logical functions NOT, AND, OR, NOR and inverted XOR can be easily realized. This is done utilizing simultaneously or alternatively Four Wave Mixing (FWM) and Cross Gain Modulation (XGM) or Cross-Phase Modulation (XPM) in the single SOA.

The use of an SOA was found particularly advantageous for the realization of different logic functions since SOAs can exhibit a strong exchange of the refraction index together with high gain. In addition, differently from the fiber devices, SOAs allow photon integration.

To clarify structure, sizing and functioning of the device in accordance with this invention the various logic functions obtainable are described below.

In the diagram of FIG. 1, A and B indicate the signals that must be processed and whose wavelengths are respectively $\lambda_A$ and $\lambda_B$.

The inverted XOR function is described first. This logic function is obtained by simultaneously using the FWM between the two A and B signals aligned in polarization and the XGM on a co-propagating probe signal (produced by an appropriate source probe 17) and whose $\lambda_{probe}$ wavelength is the same as one of the FWM terms generated ($\lambda_{probe}=\lambda_{FWM}$). The probe signal is always input into the SOA through the input element which advantageously comprises a second optical coupler 21 downstream of the first.

The diagram proposed is capable of processing either NRZ (Non Return-to-Zero) or RZ (Return-to-Zero) signals. In the former case, the probe is a Continuous Wave (CW) light while in the latter case it is a pulsating clock.

In order to avoid phase interference between probe and FWM component, the probe channel is launched in the SOA with polarization orthogonal to the signals and consequently to the FWM term.

Each A, B signal has peak input power PA, PB corresponding to the high logic level, which is high enough to saturate the device and induce a high efficiency FWM effect (that is to say $P_A, P_B >= P_{satSOA}$). The peak power of the probe is instead chosen low enough to avoid saturation of the SOA (that is to say $P_{probe} < P_{satSOA}$). A band-pass filter (15) centered on $\lambda_{FWM}$ supplies the output signal for the inverted XOR logic gate.

In this manner, when both the A and B signals are present (case 11) the power at input is such that the FWM component is generated and simultaneously the probe channel experiences very low gain in the saturated device 11. After the SOA, the term FWM is present and traverses the filter 15 so that the output of the logic gate is at high level.

Contrariwise, if both the A and B signals are absent (case 00) the FWM effect is not present and the SOA is not saturated. Therefore the probe signal experiences a strong amplification and at the output of the filter there will be a high power level. By means of an appropriate setting of the probe channel input power it is possible to equalize the high power level at the output of the inverted XOR gate in the two cases, 00 and 11.

If on the other had only one of the two A or B signals is there (cases 10 and 01), the FWM is not there but the SOA is saturated in any case (the input power of a single channel is sufficient to saturate the device), severely reducing the probe signal gain. Therefore, in cases 10 and 01, at the centered optical filter output on $\lambda_{probe}=\lambda_{FWM}$ the power level is low.

Advantageously, for the purpose of avoiding signal distortions depending on the pattern, a high powered counter-propagating CW pump 18 is launched in the SOA, decreasing the mean life of the carriers and maintaining the optimal saturation level in the SOA.

The same diagram can be used to obtain different logic gates while keeping the same input condition for the A and B signals.

In particular, if the probe channel is extinguished, the optical filter output centered on $\lambda_{FWM}$ represents an AND logic function based on the FWM.

Changing the wavelength of the probe channel so that it is $\lambda_{probe} \neq \lambda_{FWM}$ and using an optical pass-band filter 14 centered on a $\lambda_{probe}$, the NOR signal is extracted. In this case, the NOR gate is based on the XGM in the SOA.

But the NOT function can be obtained considering only an input signal in the inverted XOR or NOR realizations while exploiting the XGM on the probe channel.

Lastly, the OR function can be obtained by exploiting the XPM. In this case, the wavelength of the probe signal is fixed to obtain $\lambda_{probe} \neq \lambda_{FWM}$. As long as the input power of each signal is sufficient for saturating the device, the XPM effect induced by the presence of a single signal or of both the signals causes a similar $\Delta\lambda_{XPM}$ shift. Therefore if both the signals (case 11) or only one signal (cases 01 or 10) are in the SOA, an optical band-pass filter 16 centered on $\lambda_{filter} = \lambda_{probe} + \Delta\lambda_{XPM}$ and with an appropriate band width can extract the probe signal.

If both signals are absent (00 case), the probe signal spectrum does not move and the probe signal goes out of the filter band 16. If the probe input power is high enough to stay over the XGM effects, a high output will be obtained at the output of the filter in cases 11, 10 and 01 and a low output in case 00, thus reproducing the OR logic function.

In the following table, the necessary conditions that must be respected for the $P_{probe}$ power of the probe signal are summarized for the various logic functions, the wavelength $\lambda_{probe}$ of the probe signal and the central wavelength $\lambda_{BPF}$ of the filter. The saturation power $P_{satSOA}$ of the SOA must always be less than the power $P_H$ of the input signals that must be considered the high logic level.

|  | XOR\ | AND | NOR | OR |
|---|---|---|---|---|
| $P_{probe}$ | $0 < P_{probe} < P_{satSOA}$ | 0 | $0 < P_{probe} < P_{satSOA}$ | $0 < P_{probe} < P_{satSOA}$ |
| $\lambda_{probe}$ | $\lambda_{FWM}$ | $\lambda_{FWM}$ | $\neq \lambda_{FWM}$ | $\neq \lambda_{FWM}$ |
| $\lambda_{BPF}$ | $\lambda_{FWM}$ | $\lambda_{FWM}$ | $\lambda_{probe}$ | $\lambda_{probe} + \Delta\lambda_{XPM}$ |

The NOT function is the same as the inverted XOR or NOR function with a single input (with the other zeroed or eliminated).

It is seen how the simple and integrable diagram shown in FIG. 1, including three different filters 14, 15, 16 at the output of the SOA 11 (or alternatively a single known tunable filter 19) can be easily reconfigured to obtain different logic gates just by checking the wavelength $\lambda_{probe}$ and the input power $P_{probe}$ of the probe signal or extinguishing it.

The Bit Error Rate (BER) measurements in case of 20 ps signals at 10 Gbit/s confirm the high performance of the innovative reconfigurable diagram and its adaptability to long cascaded configurations.

Some experimental tests were made to verify the effectiveness of the device in accordance with this invention. Only the results with the NOT, AND, NOR and inverted XOR logic functions are shown. But similar results are also believed confirmed for the OR gate anyway.

FIG. 2 shows an experimental preparation used for the tests. To produce A and B signals and the probe signal, a known pulsed fiber active 10 GHz Mode Locking (ML) laser and a supercontinuum generation was used, as easily imaginable to one skilled in the art. Naturally, other sources can be used.

In particular, the A and B signals pulsed at 20 ps and the probe signal pulsed at 20 ps were obtained from a super continuum in 500 meters of Highly NonLinear Fiber (HNLF) while filtering on appropriate BPF filters at $\lambda_A = 1550.9$ nm, $\lambda_B = 1552.5$ nm, and $\lambda_{probe} = \lambda_{FWM} = 1549.3$ nm or $\lambda_{probe} \neq \lambda_{FWM} = 1546.1$ nm. The wavelength of the counter propagating CW pump was set at 1544 nm.

The semiconductor device used is a commercial SOA independent of the polarization with signal gain of 31 dB to 1547 nm. Mean input power was 3 dB, −15 dB and 10 dB respectively for signals, probe and pump.

To demonstrate the effectiveness of the diagram proposed, particular bit rates were considered for the A and B signals at the input of the reconfigurable logic gate of FIG. 1. The rates were obtained with appropriate modulation of the signal output by the generator. For one skilled in the art this is clear from the diagram of FIG. 2. For example, those of skill in the art will readily recognize the Bit Pattern Generator (BPG), Mach Zenhder (MZ), and Arrayed Waveguide Grating (AWG), as well as the Optical Delay Lines (ODL) of the optical apparatus depicted generating the test inputs A and B 12 from the output of the supercontinuum.

In FIG. 3 on the left the input rates and the corresponding output rates are shown by using the diagram respectively as inverted XOR, AND, NOR and NOT. In FIG. 3 on the right are shown the rough diagrams for each logic gate implemented. It is seen how the various logic gates are correctly implemented.

FIG. 4 shows the BER curves obtained at the output of each logic gate by using the same input rate. It can be seen that the penalty introduced at $10^{-9}$ is 0.5 dB less than the worst input signal, thus adapting the proposed diagram even for long cascaded configurations. In addition, the AND logic gate has regenerative characteristics because of the saturation effect of the SOA that compresses the high level noise.

It is now clear that the preset purposes have been achieved. The reconfigurable and integrable all optical device based on XGM, FWM and XPM in a single SOA can be reconfigured easily to produce NOT, AND, OR, NOR and inverted XOR logic functions. BER measurements using 20 ps pulsed signals at 10 Gbit/s have shown a penalty of less than 0.5 db for each logic function considered to show the effectiveness of the diagram even for cascaded configurations.

Naturally the above description of an embodiment applying the innovative principles of this invention is given by way of non-limiting example of said principles within the scope of the exclusive right claimed here.

The invention claimed is:

1. A method of operating an optical logic gate in order to perform a logic operation on optical input signals, the optical logic gate comprising a semiconductor optical amplifier having an output connected to a band pass optical filter, the method comprising:
    inputting first and second optical input signals having different wavelengths ($\lambda_A, \lambda_B$) to an input of the semiconductor optical amplifier, the first and second input optical signals having high and low states and each optical input signal configured to saturate the semiconductor optical amplifier when in the high state;
    inputting a probe signal into the semiconductor optical amplifier, the probe signal having a probe wavelength substantially equal to a four wave mixing product ($\lambda_{FWM}$) of the first and second wavelengths of the optical input signals;
    filtering the output of the semiconductor optical amplifier using the band-pass optical filter; and the band pass optical filter having a central wavelength substantially equal to the probe wavelength ($\lambda_{FWM}$).

2. The method of claim 1 wherein the probe signal comprises a Continuous Wave light if the first and second optical input signals are Non Return to Zero (NRZ) type optical input signals, and a pulsating clock if the first and second optical input signals are Return to Zero (RZ) type optical input signals.

3. The method of claim 1 wherein a counter-propagating pump signal is launched into the semiconductor optical amplifier to decrease a mean life of the carriers and to keep an optimal saturation level in the semiconductor optical amplifier to avoid pattern dependent signal distortions.

4. The method of claim 1 wherein a co-propagating probe signal has a power $P_{probe}$ that is less than the saturation power figure $P_{satSOA}$ of the semiconductor optical amplifier.

5. The method of claim 1 wherein a saturation power figure $P_{satSOA}$ of the semiconductor optical amplifier is configured to be less than a predetermined power level corresponding to a peak power of either of the first and second input optical signals.

6. The method of claim 1 wherein the probe signal is input into the semiconductor optical amplifier with a polarization that is orthogonal to the first and second input optical signals, and to the four wave mixing wavelengths.

* * * * *